United States Patent [19]

Hagiuda et al.

[11] Patent Number: 4,983,001
[45] Date of Patent: Jan. 8, 1991

[54] OPTICAL INTERFERENCE FILM HAVING HIGH AND LOW REFRACTIVE INDEX LAYERS INTER-LAYER CONNECTION OF WHICH IS STRENGTHENED

[75] Inventors: Akiko Hagiuda; Akira Kawakatsu, both of Kanagawa, Japan

[73] Assignee: Kabushiki Kaisha Toshiba, Kawasaki, Japan

[21] Appl. No.: 234,674

[22] Filed: Aug. 22, 1988

[30] Foreign Application Priority Data

Aug. 26, 1987 [JP]  Japan ................. 62-210239

[51] Int. Cl.$^5$ ............................ G02B 5/28; H01K 1/26
[52] U.S. Cl. .......................... 350/1.6; 313/112; 350/166
[58] Field of Search .............. 350/1.6, 164, 166; 313/112

[56] References Cited

U.S. PATENT DOCUMENTS

| | | |
|---|---|---|
| 4,588,923 | 5/1986 | Hoegler et al. ............ 350/166 |
| 4,663,557 | 5/1987 | Martin, Jr. et al. ........ 350/1.6 |
| 4,701,663 | 10/1987 | Kawakatsu et al. ....... 350/166 |
| 4,770,479 | 9/1988 | Tustison ..................... 350/1.6 |
| 4,784,467 | 11/1988 | Akatsuka et al. .......... 350/166 |

FOREIGN PATENT DOCUMENTS

| | | |
|---|---|---|
| 57124301 | 8/1982 | Japan . |
| 59136706 | 8/1984 | Japan . |
| 60130049 | 7/1985 | Japan . |

Primary Examiner—Bruce Y. Arnold
Assistant Examiner—Martin Lerner
Attorney, Agent, or Firm—Oblon, Spivak, McClelland, Maier & Neustadt

[57] ABSTRACT

An optical interference film being formed by alternately accumulating a low refractive index layer and a high refractive index layer having a prescribed refractive index higher than the low refractive index layer. The high refractive index layer includes at least one metal oxide selected from titanium oxide and tantalum oxide. The low refractive index layer includes silica and a prescribed amount of at least one metal oxide the same as that in the high refractive index layer to avoid inter-layer peeling of high and low refractive index layers.

10 Claims, 1 Drawing Sheet

OPTICAL INTERFERENCE FILM HAVING HIGH AND LOW REFRACTIVE INDEX LAYERS INTER-LAYER CONNECTION OF WHICH IS STRENGTHENED

BACKGROUND OF THE INVENTION

1. Field of the Invention

The present invention relates to optical interference films. The optical interference film is generally used with a lamp. Two different kinds of optical interference films are practically used. One of the optical interference films reflects infrared rays and transmits visible rays. The other optical interference film reflects visible rays and transmits infrared rays.

2. Description of the Related Art

Halogen lamps which may reduce the amount of infrared rays in the light radiated therefrom are known in recent years. Halogen lamp includes a straight bulb in which a tungsten coil filament is disposed along the center line of the straight bulb. At least one surface of inner and outer surfaces of the bulb is provided with an optical interference film. The optical interference film transmits visible rays and reflects infrared rays in light radiated from the coil filament. Therefore, infrared rays reflected by the optical interference film returns toward the filament, and heats up the filament, resulting in a high luminous efficiency in halogen lamp.

The above-described optical interference film includes a high refractive index layer made of titanium oxide and the like and a low refractive index layer made of silica and the like alternately accumulated one to the other at ten to fifteen layers on the bulb. Interference of light occurs when light from the light source, e.g., filament, passes through the high and low refractive index layers. The light of a specific wavelength range may be transmitted or reflected by controlling thickness of each refractive index layer.

In such an optical interference film, reflection factor of the optical interference film increases, as number of high and low refractive index layers increase. However, cracks or inter-layer peeling of the optical interference film tend to occur. In particular, since the bulb temperature of the above-described halogen lamp is high during the operation, cracks or inter-layer peeling tend to occur in the optical interference film attached to the bulb of the halogen lamp. To avoid such cracks or peeling, number of high and low refractive index layers are reduced in the optical interference film of the halogen lamp. Therefore, a desirable optical characteristics may not be achieved in the above-described optical interference film of halogen lamp.

Another solution of cracks or inter-layer peeling of the optical interference film is disclosed in U.S. Pat. No. 4,701,663, issued to the same assignee, and entitled LAMP HAVING INTERFERENCE FILM, and U.S. patent application Ser. No. 925,388/87 of the same assignee, and entitled LAMP WITH OPTICAL INTERFERENCE FILM AND METHOD FOR MAKING THEREOF, corresponding to Japanese patent Laid-open Publication No. 105357/87. In the above-described prior art, a high refractive index layer includes at least one metal oxide, as a main element, selected from titanium oxide, tantalum oxide and zirconium oxide. A low refractive index layer includes silica, as a main element. The low refractive index layer also includes at least one additive selected from phosphorus and boron to moderate strain in each refractive index layer which is caused by difference in heat expansion ratio between high and low refractive index layers (U.S. Pat. No. 4,701,663). The high refractive index layers includes at least one additive selected from phosphorus, boron, arsenic, antimony, tin, zinc, lead, potassium, nickel, and cobalt and the low refractive index layer includes at least one additive selected from phosphorus and boron (U.S. Ser. No. 925388/86). Therefore, cracks caused by difference in heat expansion ratio between the two layers can be decreased. However, prevention of peeling between high and low refractive index layers of optical interference film is not sufficient. In particular, such a peeling also occurs in a dichroic film attached to a lamp with a reflection mirror operation temperature of which is relatively low. Therefore, it is rather difficult to accumulate each refractive index layer at a desirable numbers.

SUMMARY OF THE INVENTION

Accordingly, it is an object of the present invention to avoid inter-layer peeling of an optical interference film including high and low refractive layers alternately accumulated one to the other at a prescribed number of layers.

To accomplish the above-object, an optical interference film includes a high refractive index layer having at least one metal oxide selected from titanium oxide and tantalum oxide, and a low refractive index layer having silica and being formed on the high refractive index layer. The high refractive index layer has a refractive index higher than the low refractive index layer. The low refractive index layer includes at least one metal oxide the same as that in the high refractive index layer. The high and low refractive index layer each may include at least one additive selected from the group consisting of phosphorus and boron.

BRIEF DESCRIPTION OF THE ACCOMPANYING DRAWINGS

Other features and advantages of the present invention will be apparent from the following description taken in connection with the accompanying drawings wherein:

FIG. 1 is a sectional side view illustrating a halogen lamp with an optical interference film of one embodiment of the present invention; and FIG. 2 is a sectional view illustrating the optical interference film attached to the halogen lamp shown in FIG. 1.

DETAILED DESCRIPTION OF THE PREFERRED EMBODIMENT

Figure 1:
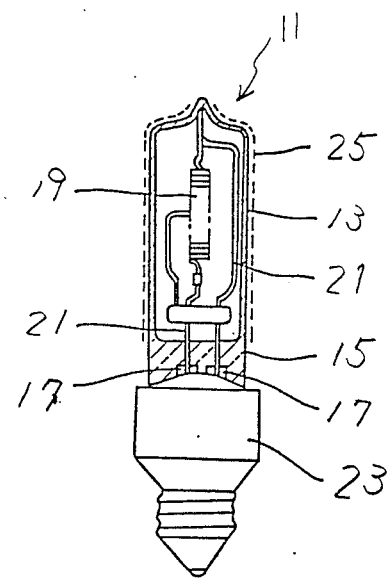

The preferred embodiment of the present invention will now be described in more detail with reference to the accompanying drawings. In this embodiment, the present invention is applied to a well known halogen lamp. A halogen lamp 11 includes a transparent straight bulb 13 made of a quartz glass or an aluminosilicate glass. Bulb 13 has a high heat resistance. One end of bulb 13 is closed, and the other end of bulb 13 is pinched to form a sealed portion 15. A pair of molybdenum foils 17, 17 is disposed in sealed portion 15. A coiled filament 19 acting as a light emitting material is arranged along the center line of bulb 13. Each end of coiled filament 19 is connected to the individual foil 17 through a pair of inner lead wires 21, 21 respectively. Sealed portion 15 of bulb 13 is fixed into a metallic cap 23. An inert gas such as argon and a prescribed amount of halogen are filled into bulb 13. An optical interference film 25 is formed to at least one of outer and inner surfaces, e.g., outer surface, of bulb 13.

Figure 2:
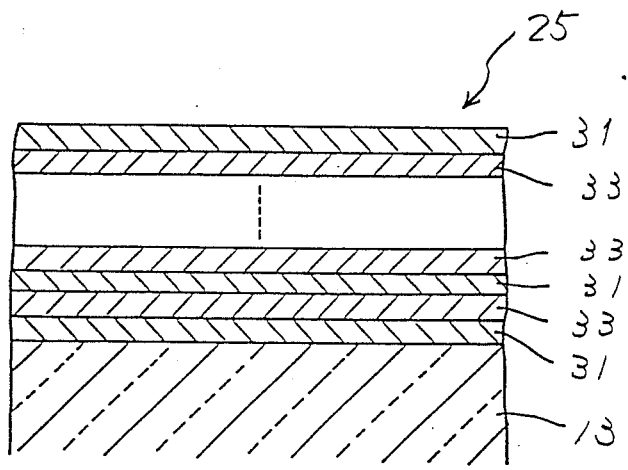

The construction of the above-described optical interference film 25 will be described hereafter. As shown in FIG. 2, a high refractive index layer 31 is formed on the surface of bulb 13 (light permeable base). A low refractive index layer 33 also is formed on high refractive index layer 31. High and low refractive index layers 31 and 33 are alternately accumulated one to the other at a prescribed number of layers, e.g., 15 to 21 layers. The thickness of each refractive index layer is controlled at a predetermined value to transmit visible rays and reflect infrared rays by optical interference. High refractive index layer 31 includes at least one metal oxide material as a main component selected from titanium oxide and tantalum oxide, and a prescribed amount of phosphorus and/or boron to form the layer uniformly. Low refractive index layer 33 includes silica as a main component. Low refractive index layer 33 also includes a prescribed amount of phosphorus and/or boron to form low refractive index layer 33 uniformly. Furthermore, low refractive index layer 33 includes at least one metal oxide selected from titanium and tantalum consistent with the main component of high refractive index layer 31. If high refractive index layer 31 includes titanium oxide, low refractive index layer 33 has to include at least titanium oxide. Also, if tantalum oxide is selected as a main component in high refractive index layer 31, low refractive index layer 33 has to include at least tantalum oxide.

The above-described optical interference film 25 including high and low refractive index layers 31 and 33 is formed on halogen lamp 11 by the following processes. In a first process, bulb 13 of halogen lamp 11 is dipped into a titanium liquid at a prescribed depth. The titanium liquid is obtained by dissolving an organotitanium compound such as titanium alkoxide into an alcohol solvent together with phosphorus and/or boron. Bulb 13 is drawn up from the titanium liquid at a prescribed speed. Thus, the titanium liquid is applied to the outer surface of bulb 13 at a prescribed thickness. Bulb 13 with the titanium liquid is baked at about 500° to 600° C. for about ten minutes in an atmosphere after drying. Thus, the organotitanium compound and other compound of phosphorus and/or boron are decomposed, and therefore, high refractive index layer 31 including titanium oxide, as a main element, and other metal oxide of phosphorus and/or boron is fixed on the outer surface of bulb 13. In a second process, bulb 13 on which high refractive index layer 31 is fixed is dipped into a silicon liquid. The silicon liquid is obtained by the following manner. An alkoxysilane condensed solvent is produced when an organosilicon compound, such as alkoxysilane, reacts on water. The silicon liquid is obtained by dissolving a prescribed amount of organotitanium compound, and phosphorus and/or boron into an alcohol solvent together with the alkoxysilane condensed solvent. Bulb 13 is drawn up from the silicon liquid at a prescribed speed. Thus, the silicon liquid is applied at a prescribed thickness to the high refractive index layer 31 fixed on the surface of bulb 13. Bulb 13 with the silicon liquid is baked at about 500° to 600° C. for about ten minutes in the atmosphere after drying. Thus, the organosilicon compound and other compound of phosphorus and/or boron are decomposed. Therefore, low refractive index layer 33 including silica, as a main element, and metal oxide of titanium phosphorus and/or boron is fixed on high refractive index layer 31 formed on bulb 13. The above-described processes are repeatedly executed to form optical interference film 25 having a desirable optical characteristics on bulb 13, as shown in FIG. 1. The thickness of each refractive index layer 31, 33 can be controlled by respectively regulating density and viscosity of the titanium liquid and the silicon liquid at each desired level.

As stated before, in halogen lamp 11 obtained by the above-described processes, visible rays in the light radiated from filament 19 are transmitted through optical interference film 25, and infrared rays in the light are reflected by optical interference film 25. Infrared rays reflected by optical interference film 25 heats up filament 19, and thus, the luminous efficiency of filament 19 is enhanced. Therefore, the above-described halogen lamp 11 has a high efficiency and radiates light including a small amount of infrared rays.

In general, a thermal expansion coefficient between a high refractive index layer and a low refractive index layer is greatly different from one the other. Furthermore, bulb 13 of halogen lamp 11 is heated at an extremely high temperature during the operation. However, in the above-described embodiment, since high and low refractive index layers 31 and 33 include phosphorus and/or boron, strain between high and low refractive index layers 31 and 33 caused by the difference in heat expansion coefficient of each layer 31, 33 is moderated, and cracks of optical interference film 25 may be avoided. Furthermore, since the silica of low refractive index layer 33 includes titanium (element) which is the same component as that in high refractive index layer 31, titanum atoms in high refractive index layer 31 are chemically coupled with titanum atoms in low refractive index layer 33 with oxygen atoms when the low refractive index layer is baked. An adhesive force between high and low refractive index layers is enhanced. The interlayer peeling of optical interference film 25 is avoided even though lamp 11 operates for an extended period under a high temperature. This is because the adhesive force between high and low refractive index layers overcomes the strain between high and low refractive index layers caused by the strain in each refractive index layer 31, 33.

Following table shows the results of experiment of an inter-layer peeling of optical interference film 25 when the amount of titanium oxide (wt %) added to silica in low refractive index layer 33 varies in halogen lamp 11, shown in FIG. 1.

TABLE

|  | I | II | III |
|---|---|---|---|
| AMOUNT OF TiO$_2$ (wt %) | 5 | 3 | 0 |
| OCCURRENCE OF INTER-LAYER PEELING | MORE THAN TWENTY LAYERS | SEVENTEEN LAYERS | FIFTEEN LAYERS |

In the above-described experiment, the amount of phosphorus added to titanium oxide of the high refractive index layer is 2% by weight, and the amount of phosphorus added to the silicon oxide of the low refractive index layer also is 2% by weight.

As can be understood from the above TABLE, occurrence of inter-layer peeling between high and low refractive index layers decreases when the amount of titanium oxide added to the low refractive index layer increases. However, when the amount of titanium oxide in the low refractive index layer increases, the refractive index of the low refractive index layer increases, and the optical characteristics thereof is degraded.

According to the experiment described above, the upper limit of the amount of titanium oxide added to the low refractive index layer is 15 (wt %). If the amount of titanium oxide is more than 15 (wt %), the optical characteristics of the low refractive index layer is reversely affected rather than the improvement of the interlayer peeling.

In the above-described embodiment, a main component of the high refractive index layer is titanium oxide. However, tantalum oxide or two components of tantalum oxide and titanium oxide may be used as a main component.

As will be stated below, a component added to the low refractive index layer is determined based on the main component of the high refractive index layer.

(1) The component added to the low refractive index layer is titanium when the main component of the high refractive index layer is titanium oxide;

(2) The component of the low refractive index layer is tantalum when the main component of the high refractive index layer is tantalum; and (3) The component of the low refractive index layer is at least one of titanium and tantalum when the main component of high refractive index layer is two components of titanium oxide and tantalum oxide.

A method for adding titanium and/or tantalum to the low refractive index layer is not limited to the above described manner. For example, two-way vacuum distillation of the two components, vacuum evaporation of mixture of the two components, sputtering, or CVD (chemical vapor deposition) method may be used.

The above-described embodiment discloses the optical interference film which transmits visible rays and reflects infrared rays. However, the present invention may be applied to an optical interference film which transmits infrared rays and reflects visible rays.

The optical interference film of the present invention may be applied to a lamp which is frequently turned on and off, e.g., light source of copying machines. The optical interference film of the present invention may also be applied to an outer tube or a light radiating tube of a metal halide lamp when the optical interference film transmits visible rays and reflects infrared rays. When the optical interference film transmits infrared rays and reflects visible rays, it may be applied to a reflector lamp or a reflection film (dichroic film) of a lamp having a reflection mirror. In particular, when the present invention is applied to a dichroic film which is used under a relatively low temperature, the inter-layer peeling of such a dichroic film may also be avoided.

The present invention has been described with respect to a specific embodiment. However, other embodiments based on the principles of the present invention should be obvious to those of ordinary skill in the art. Such embodiments are intended to be covered by the claims.

What is claimed is:

1. An optical interference film comprising:
   a high refractive index layer including at least one metal oxide selected from titanium oxide and tantalum oxide; and
   a low refractive index layer formed on the high refractive index layer, including silica and an amount greater than would be present due to molecular diffusion of at least one metal oxide the same as that of the high refractive index layer, the low refractive index layer having a prescribed refractive index lower than the high refractive index layer.

2. A film according to claim 1, wherein the high refractive index layer includes at least one additive selected from the group consisting of phosphorus and boron.

3. A film according to claim 1, wherein the low refractive index layer includes at least one additive selected from the group consisting of phosphorus and boron.

4. A film according to claim 1, wherein the amount of the metal oxide added to the silica in the low refractive index layer is equal to or less than 15% by weight.

5. A film according to claim 3, wherein the amount of the metal oxide added to the silica in the low refractive index layer is equal to or less than 15% by weight.

6. A lamp which reflects infrared rays and transmits visible rays, the lamp comprising:
   a light permeable tube;
   a filament supported in the light permeable tube;
   an optical interference film formed on the surface of the light permeable tube, the optical interference film including a plurality of high and low refractive index layers alternately accumulated one to the other, the high refractive index layer having a predetermined refractive index higher than the low refractive index layer, the high refractive index layer including at least one metal oxide selected from titanium oxide and tantalum oxide, the low refractive index layer including silica and an amount greater than would be present due to molecular diffusion of at least one metal oxide the same as that of the high refractive index layer.

7. A lamp according to claim 6, wherein the high refractive index layer includes at least one additive selected from the group consisting of phosphorus and boron.

8. A film according to claim 6, wherein the low refractive index layer includes at least one additive selected from the group consisting of phosphorus and boron.

9. A film according to claim 6, wherein the amount of the metal oxide added to the silica in the low refractive index layer is equal to or less than 15% by weight.

10. A film according to claim 8, wherein the amount of the metal oxide added to the silica in the low refractive index layer is equal to or less than 15% by weight.

* * * * *